March 7, 1967 M. T. GACIOCH 3,307,471

HEATING APPARATUS ENCLOSURE

Filed Aug. 25, 1964 3 Sheets-Sheet 1

INVENTOR.
MICHAEL T. GACIOCH
BY Frederick E. McMullen

ATTORNEY

March 7, 1967 M. T. GACIOCH 3,307,471
HEATING APPARATUS ENCLOSURE
Filed Aug. 25, 1964 3 Sheets-Sheet 3
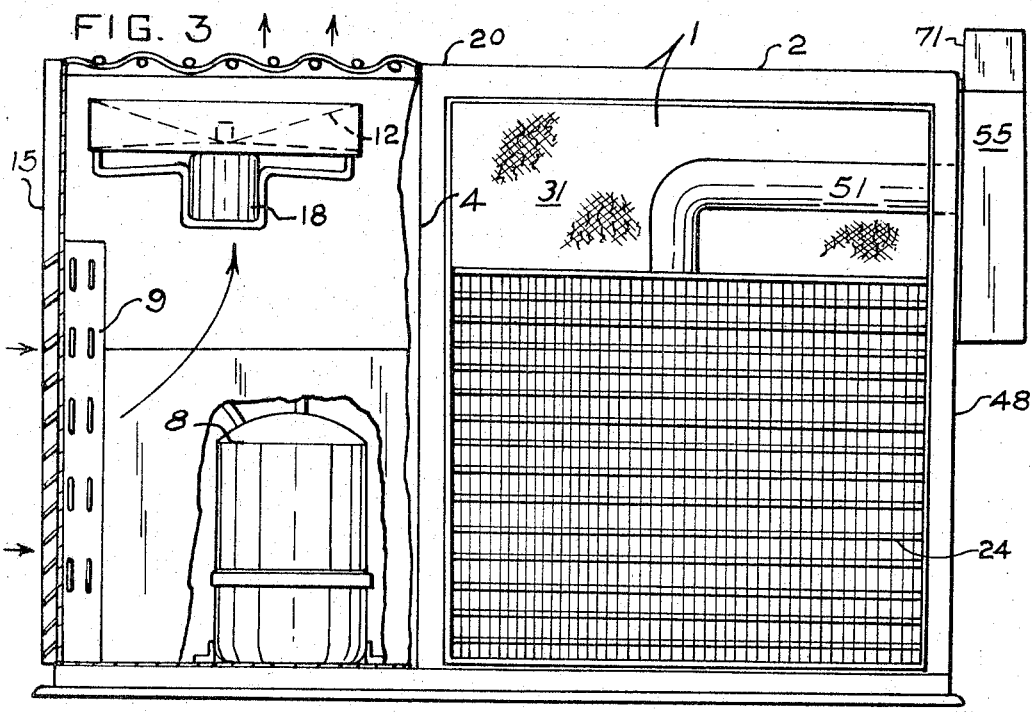
FIG. 3
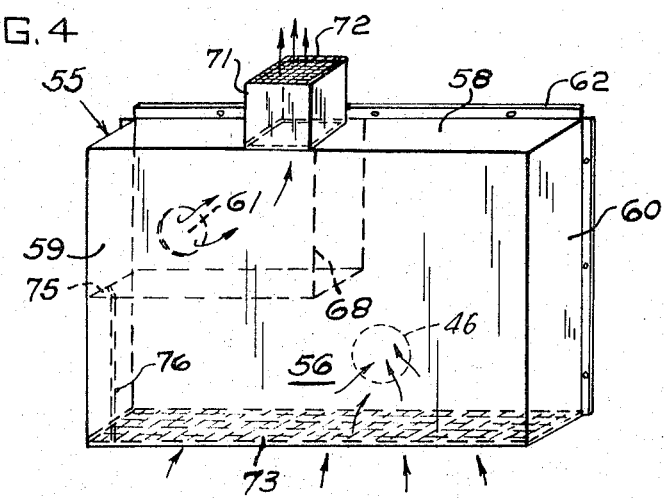
FIG. 4
FIG. 5
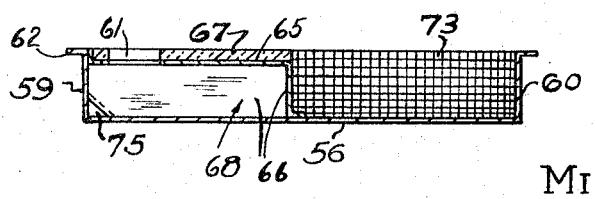
INVENTOR.
MICHAEL T. GACIOCH
BY Frederick E. McMullen
ATTORNEY

United States Patent Office 3,307,471
Patented Mar. 7, 1967

3,307,471
HEATING APPARATUS ENCLOSURE
Michael T. Gacioch, Syracuse, N.Y., assignor to Carrier Corporation, Syracuse, N.Y., a corporation of Delaware
Filed Aug. 25, 1964, Ser. No. 391,992
1 Claim. (Cl. 98—62)

This invention relates to heating apparatus, and more particularly, to a weather enclosure for the combustion air intake and flue gas outlet passages of combustion type heating apparatus.

It is often convenient to dispose the heating apparatus for buildings or homes out of doors. Where the heating apparatus is of the combustion type, relying on the atmosphere both as a source of combustion air and as a sump for the products of combustion, air intake and flue discharge passages in the heating apparatus housing permit ingress of combustion air and egress of the products of combustion therefrom. Since the combustion air intake and flue gas discharge passages are necessarily open to the atmosphere, it is usually found necessary to shield the combustion air intake and flue gas discharge passages from weather effects, such as wind, rain, snow; and from foreign objects such as birds, paper, and so forth.

It is a principal object of the present invention to provide a new and improved weather enclosure for heating apparatus.

It is a further object of the present invention to provide a unique weather enclosure for shielding the combustion air intake and flue gas discharge passages of a furnace from weather effects and foreign objects.

It is an object of the present invention to provide an enclosure for use with combustion type heating apparatus adapted to overlay the heating apparatus combustion air intake and combustion products discharge openings to prevent ingestion of foreign objects into the heating apparatus.

It is a further object of the present invention to provide a baffled enclosure for the air intake and flue discharge passages of a combustion type heating apparatus with prevents seepage of rain water through the air intake and flue discharge passages into the heating apparatus.

This invention relates to a weather protective device for use with heating apparatus having a first aperture in a side thereof for the flow of combustion air thereinto and a second aperture in the side for the exhaust of combustion gas therefrom comprising in combination wall means adapted to overlay the second aperture having an opening therethrough communicable with the second aperture, means forming with the heating apparatus side an enclosure surrounding the first and second apertures, the enclosure forming means overlaying the wall means and having first and second openings therethrough, and partitioning wall means separating the enclosure forming means first opening from the second opening secured between the wall means and the enclosure forming means, the partitioning wall means cooperating with the wall means and the enclosure forming means to form a chamber communicating combustion gas with the second opening and the atmosphere.

Other objects will be apparent from the ensuing description and drawings in which:

FIGURE 3 is an end view partially in section of the apparatus shown in FIGURE 1;

FIGURE 4 is a perspective view showing applicant's weather enclosure; and

FIGURE 5 is a cross-sectional view of the weather enclosure illustrated in FIGURE 4.

While applicant's improved weather enclosure is, in the ensuing description, incorporated in an apparatus adapted to cool as well as heat, it will be understood that applicant's improved weather enclosure is intended for use with combustion type heating apparatus generally.

Figure 1:
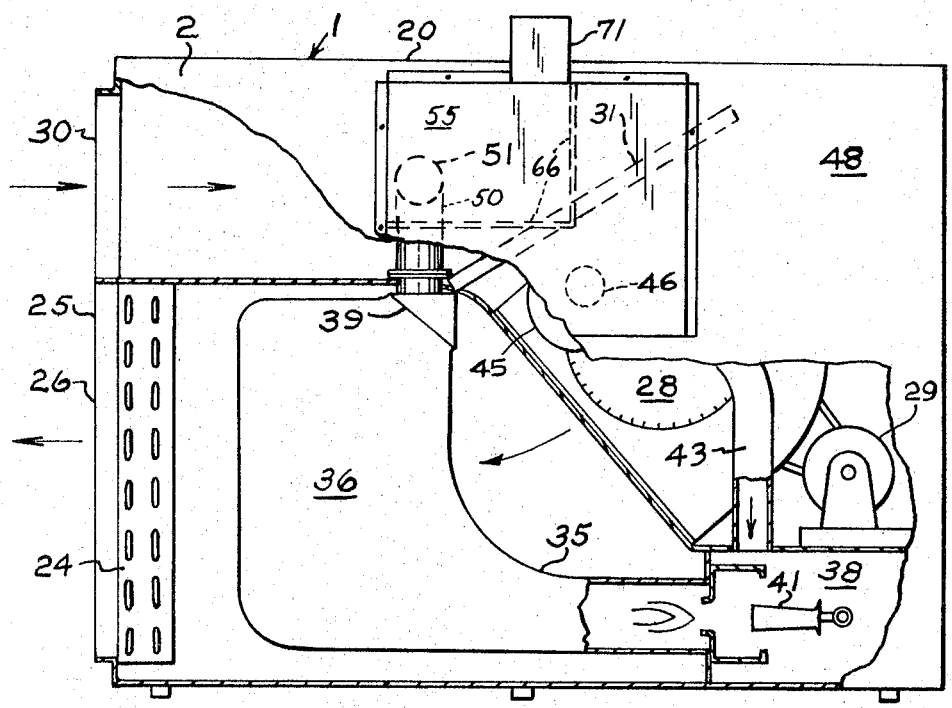
FIGURE 1 is a side view partially in section of an apparatus embodying applicant's novel weather enclosure.
Figure 2:
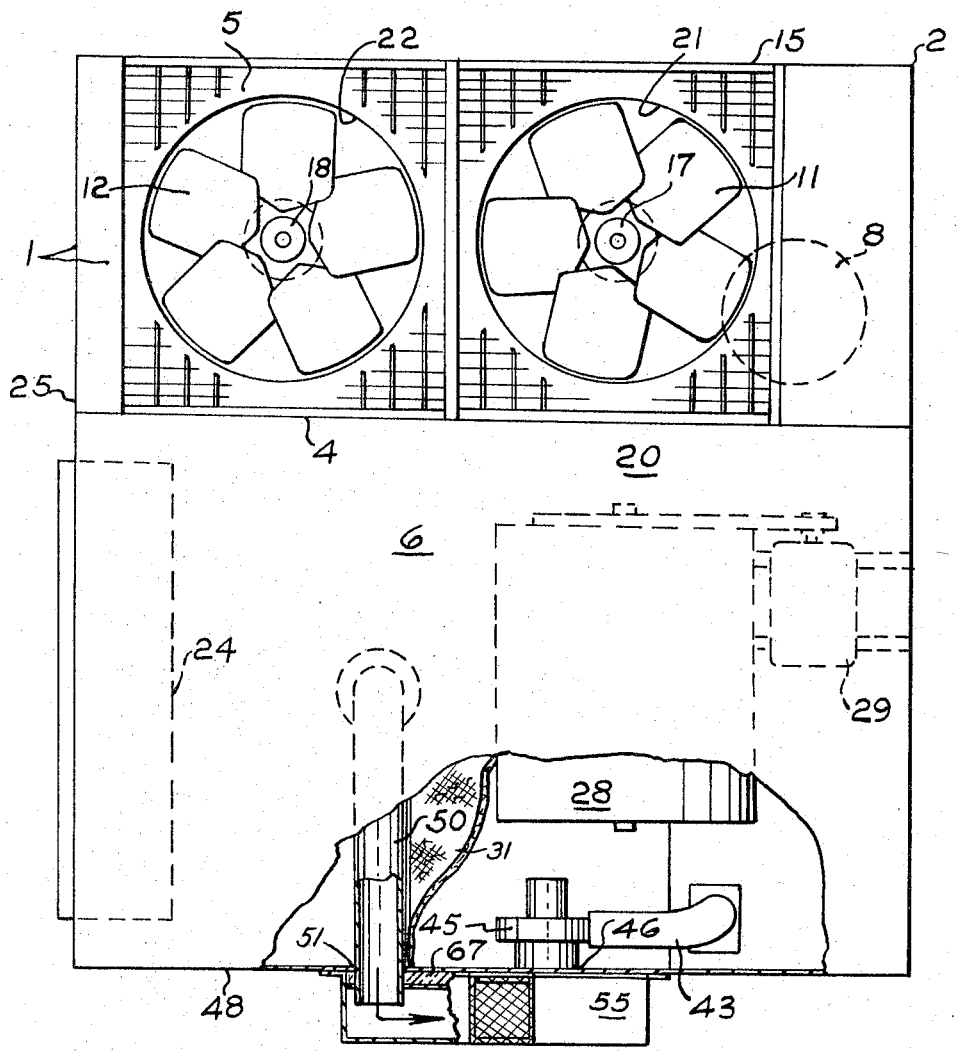
FIGURE 2 is a top view partially in section of the apparatus shown in FIGURE 1.

Referring particularly to FIGURES 1, 2, and 3 of the drawings, there is shown a conditioning apparatus 1 of the type adapted to heat or cool a closed area incorporating applicant's novel weather enclosure. The conditioning apparatus 1 is normally disposed without the area being conditioned, preferably in the ambient. Suitable duct work may be provided communicating the conditioning apparatus 1 with the area being conditioned.

A generally rectangular housing 2 encases both the heating and cooling components of the conditioning apparatus 1. Partition member 4 separates housing 2 into condenser compartment or section 5 and furnace compartment or section 6. Refrigerant compressor 8, condenser coil 9 and condenser fans 11, 12 are disposed in condenser section 5. Compressor 8 is preferably a motor driven refrigerant compressor unit of the hermetic type. Condenser coil 9 is positioned adjacent outside wall 15 of housing 2. A suitable opening is provided in outside wall 15 to permit ingress of outside ambient air therethrough into heat exchange relationship with coil 9.

Condenser fans 11, 12 and their associated drive motors 17, 18 are suitably suspended from top wall 20 of housing 2. Condenser fans 11, 12 draw ambient air through the opening in the outside wall 15 into heat exchange relation with condenser 9, fans 11, 12 discharging through openings 21, 22 in top wall 20 into the atmosphere.

Refrigerant evaporator coil 24 is disposed in furnace section 6 adjacent front wall 25 of housing 2 opposite discharge opening 26. Compressor 8, condenser coil 9 and evaporator coil 24 are interconnected by suitable conduit means in a closed refrigeration circuit. A suitable refrigerant expansion means (not shown) is provided in the refrigeration circuit between condenser coil 9 and evaporator coil 24. As will be more fully explained hereinafter, air to be conditioned passes through evaporator coil 24 and discharge opening 26 in front wall 25 into the area being conditioned.

A fan 28, suitably supported in furnace section 6 and having drive motor 29 operatively connected thereto, draws air to be conditioned through inlet passage 30 and filter 31 in furnace section 6. Air discharged by fan 28 passes through furnace heat exchanger 35, evaporator coil 24 and discharge opening 26 into the area being conditioned. Inlet passage 30 communicates either directly or by means of suitable duct work (not shown) with the source of air to be conditioned which may be atmospheric air, or return air from the area being conditioned, or a mixture thereof. Discharge opening 26 communicates either directly or by means of suitable duct work (not shown) with the area being conditioned.

Furnace heat exchanger 35 is suitably secured in furnace section 6 in the stream of air discharged by fan 28. Heat exchanger 35 preferably comprises a plurality of closely spaced L-shaped heat exchange members 36 joined at one end to combustion air box 38 and at the opposite end to flue collection box 39. Burner nozzles 41, which communicate with a suitable source of combustionable medium, such as natural gas, are disposed in combustion air box 38 in operative relationship with heat exchanger 35. Suitable ignition means (not shown) are provided.

Conduit 43 communicates combustion air box 38 with the discharge side of combustion air fan 45. Opening 46 in side wall 48 of housing 2 communicates the inlet side of fan 45 with the atmosphere. Flue gas discharge conduit 50 extends through opening 51 in side wall 48 of housing 2 and terminates a slight distance therebeyond. Openings 46 and 51 in side wall 48 are adjacent one another.

To facilitate the ingress of combustion air to combustion air box 38 and the egress of combustion or flue products from flue collection box 39, and to shield against the vagaries of atmospheric weather conditions, applicant provides a unique weather enclosure or baffle 55 for combustion air and flue gas discharge openings 46, 51, respectively. Referring particularly to FIGURES 4 and 5 of the drawings, weather enclosure 55 is comprised of a generally rectangular outside cover or wall 56 having top wall 58 and side walls 59, 60 extending therefrom. Top and side walls 58 and 59, 60, respectively, are flared outwardly at 62 to present a substantially planar face for tight and sealing abutment with side wall 48 of housing 2.

A generally rectangular inside or rear wall 65 having an area substantially less than the area of outside wall 56 is secured between adjoining portions of top and side walls 58, 59, respectively, opposite flue gas discharge opening 51. Inside wall 65 is spaced between outside wall 56 and flared portion 62 of top and side walls 58, 59, respectively. An opening 61 is provided in inside wall 65 dimensioned to closely receive the extended end of flue gas discharge conduit 50. Suitable thermal insulating material 67 is preferably secured to the outside surface of wall 65. An L-shaped partitioning wall 66 is fixed between outside wall 56 and inside wall 65. The opposite ends of partitioning wall 66 tightly and sealingly abut top wall 58 and side wall 59, respectively. Inside wall 65 and partition wall 66 cooperate with outside wall 56 and the portions of top and side walls 58, 59, respectively, between partition wall 66 to form flue gas discharge chamber or compartment 68.

Stack 71 in top wall 58 communicates flue gas compartment 68 with the atmosphere. Stack 71 serves to raise the discharge point of the flue gases above the level of top wall 20 of housing 2. Stack 71 preferably includes discharge screen 72 thereacross. Inlet screen 73 is provided adjacent the lower side of outside wall 56 between side walls 59, 60. Screens 72, 73 serve to prevent the influx of foreign matter into the weather enclosure and the combustion air and flue gas discharge openings 46, 51, respectively.

Partition wall 66 of weather enclosure 55 is provided with a water disposal opening 75 therethrough. Opening 75 is preferably formed at the juncture of partition wall 66 with side wall 59 and front wall 56. Side member 76, bridged between outside wall 56 and side wall 59, cooperates with walls 56, 59 to form a passage permitting water in flue gas compartment 68 to drain into the atmosphere relatively unaffected by the stream of combustion air flowing upwardly through intake screen 73 into the combustion air opening 46.

Applicant has provided a unique weather enclosure which effectively promotes the ingress of combustion air into the heating apparatus and the egress of the products of combustion therefrom while shielding the heating apparatus from outside effects, such as wind, rain, and foreign objects; a unique weather enclosure economical of construction which functions as an important and integral part of a heating apparatus.

While I have described a preferred embodiment of the invention, it will be understood that the invention is not limited thereto since it may be otherwise embodied in the scope of the following claim.

I claim:

A protective device adapted to overlay the combustion air aperture and flue gas aperture of a heating apparatus to prevent ingestion of foreign matter into the heating apparatus comprising an outside wall; a side wall projecting inwardly from the peripheral edges of said outside wall, said side wall being discontinuous to provide a combustion air opening, said side wall including a flanged inner edge adapted to tightly abut the heating apparatus; a partitioning wall projecting inwardly from said outside wall having opposite ends thereof tightly engaged between portions of said side wall, said partitioning wall separating said side wall into a first wall section including said combustion air opening and a second wall section; and an inside wall paralleling said outside wall disposed between said partitioning wall and said side wall second wall section to form in cooperation with said outside wall, said partitioning wall, and said side wall second wall section a separate flue gas compartment, said inside wall having an opening therethrough communicable with said flue gas aperture, said side wall second wall section having a flue opening therethrough to permit egress of flue gas from said compartment, said outside wall being generally rectangular with top, bottom, and opposed side edges; said side wall comprising first and second wall members projecting inwardly from the side edges of said outside wall with a third wall member projecting inwardly from said outside wall top edge between said first and second wall members; said partitioning wall comprising a fourth wall member between and parallel to said first and second wall members, one end of said fourth wall member abutting said third wall member, and a fifth wall member parallel to said third wall member and between said first wall member and the other end of said fourth wall member.

References Cited by the Examiner
UNITED STATES PATENTS

| | | |
|---|---|---|
| 2,632,435 | 3/1953 | Lundstrum. |
| 2,647,477 | 8/1953 | Martin. |
| 2,966,838 | 1/1961 | Thompson et al. _____ 126—85 X |
| 2,998,764 | 9/1961 | Bedell et al. _____ 126—85 X |
| 3,056,400 | 10/1962 | Hammersley et al. |

FREDERICK KETTERER, *Primary Examiner.*